P. L. HEDBERG.
EXTENSIBLE AUTOMOBILE BOX OR BODY.
APPLICATION FILED MAR. 28, 1921.
1,392,011.
Patented Sept. 27, 1921.
2 SHEETS—SHEET 1.
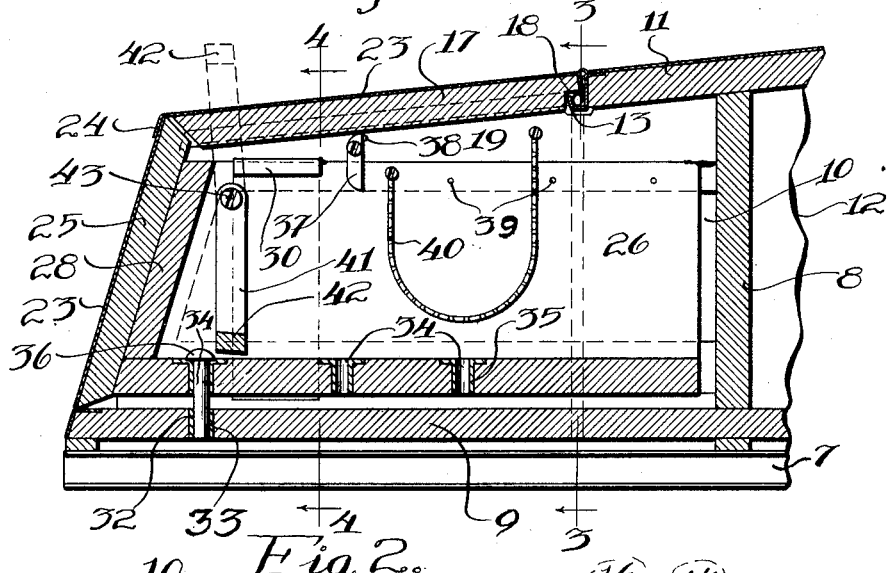
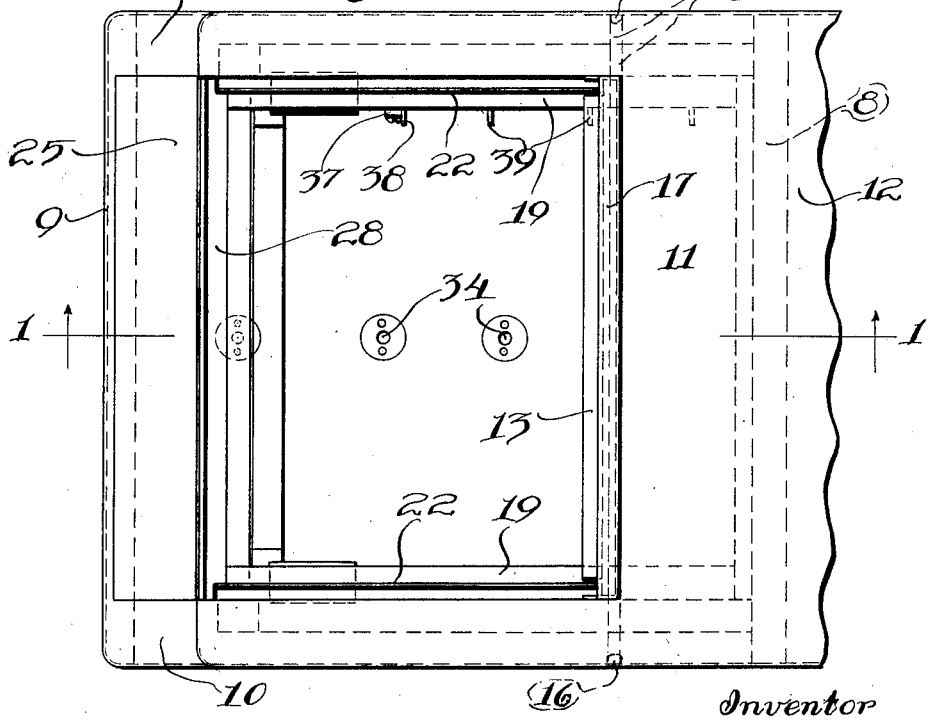

P. L. HEDBERG.
EXTENSIBLE AUTOMOBILE BOX OR BODY.
APPLICATION FILED MAR. 28, 1921.
1,392,011.
Patented Sept. 27, 1921.
2 SHEETS—SHEET 2.
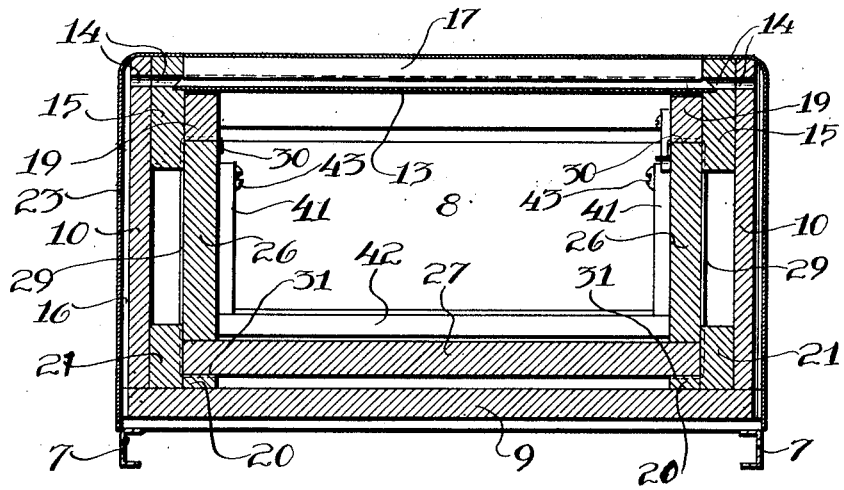
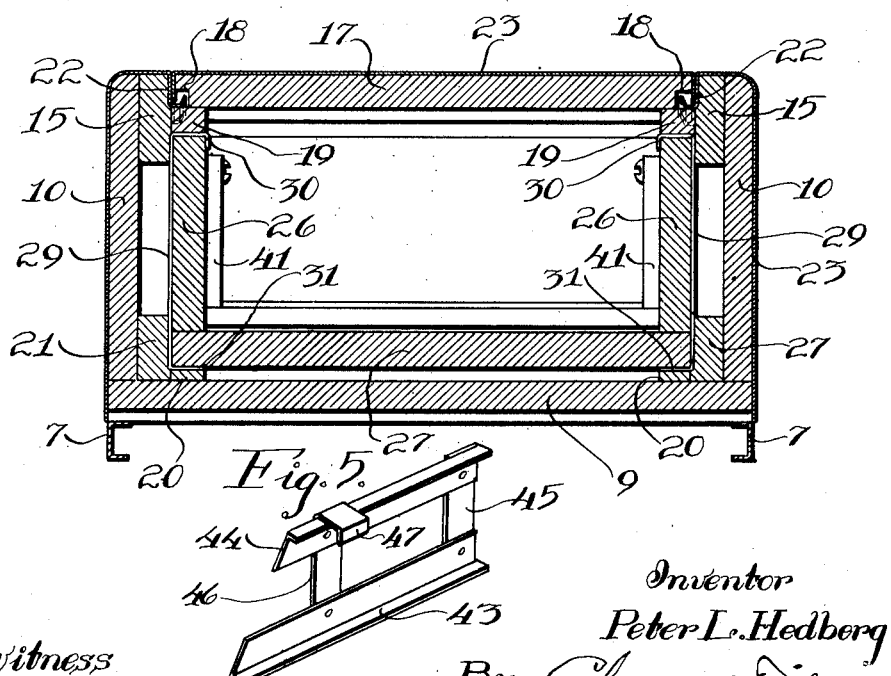
Witness
Geo. L. Lawrence
Inventor
Peter L. Hedberg
By Chas. C. Tillman
Attorney.

UNITED STATES PATENT OFFICE.

PETER L. HEDBERG, OF CHICAGO, ILLINOIS.

EXTENSIBLE AUTOMOBILE BOX OR BODY.

1,392,011. Specification of Letters Patent. Patented Sept. 27, 1921.

Application filed March 28, 1921. Serial No. 456,154.

*To all whom it may concern:*

Be it known that I, PETER L. HEDBERG, a citizen of the United States, and a resident of Chicago, county of Cook, and State of Illinois, have invented certain new and useful Improvements in an Extensible Automobile Box or Body, of which the following is a specification.

This invention relates to improvements in automobiles and has particular relation to the rear portion of the body of such vehicles, and while it is more especially intended to be used in connection with automobiles of the well known Ford run-about and Ford coupelet types, yet it is applicable for use in connection with the bodies of automobiles of the more expensive class and of other than the above named types, and can be readily embodied or incorporated in the rear portion of the bodies thereof, with but slight alterations.

In the above mentioned Ford run-about and coupelet types, the rear portion of the body of each car is equipped with a detachable box for luggage, tools and other articles, which boxes are comparatively small in size and hence will not accommodate very many articles of considerable bulk or length.

To provide an extensible box for interchangeable use with the detachable boxes of Ford run-abouts and coupelets is one of the many objects of the invention.

A further object is to provide means whereby the boxes for luggage and the like on the rear portion of motor vehicles of any desired type can be readily converted into an extensible box or carrier which when not intended for use can have its parts so positioned with respect to one another as to present the appearance of an ordinarily constructed box or rear portion of an automobile.

Another object of the invention is to provide means employed in connection with the movable or extensible part of the box or body which can be readily positioned and maintained at a point above the upper surface of said movable part so as to provide a rest for the support of the rear portion of elongated articles, such as slats, planks, scantling, wooden strips and the like, the forward or front ends of which may be supported on and suitably secured to the upper front portion of the box.

Still another object is to provide means for locking or securing the movable or extensible part of the box against rearward accidental dislocation.

Other objects and advantages of the invention will be disclosed in the subjoined description and explanation.

The invention consists in certain peculiarities of the construction, novel arrangement and combination of the various parts thereof as will be hereinafter more fully set forth and specifically claimed.

In the accompanying drawings, which serve to illustrate an embodiment of the invention—

Figure 1 is a longitudinal sectional view of the rear portion of the frame of an automobile and a part of the box or body thereof embodying my improvements, said view being taken on line 1—1 of Fig. 2 looking in the direction indicated by the arrows.

Fig. 2 is a plan view of the device showing the hinged cover thereof in its vertical or raised position.

Fig. 3 is a cross-sectional view taken on line 3—3 of Fig. 1.

Fig. 4 is a similar view taken on line 4—4 of Fig. 1, and

Fig. 5 is a detached perspective view of a modified form of one of the guides for the sides of the slidable part of the box.

Like numerals of reference refer to corresponding parts throughout the different views of the drawings.

The side rails of the chassis or frame of the vehicle are indicated by the reference numerals 7 and may be of any suitable construction but preferably of channel iron, as shown. Mounted on the rear portion of the frame 7 and secured thereto in any suitable manner is a substantially rectangular shaped box which comprises an upright and transversely disposed front wall 8 and a horizontally and rearwardly extended floor 9, side walls 10, and a rearwardly and horizontally disposed fixed top portion 11, which portion terminates a slight distance rearwardly of the front wall 8 of the box.

It will be understood that the above mentioned parts of the box are secured together in any suitable manner and may, if desired, be built in or form an integral part of the rear portion of the body 12 of the vehicle, that is, that part thereof rearwardly of the hindmost seat of the vehicle. This box, however, may be and usually is, when intended for run-about cars of the Ford type, separate from the body and detachable from its mount, the frame of the automobile.

It will be observed by reference to Figs. 1 and 2 of the drawings that the rear ends of the side walls 10 have no permanent transverse connection except the floor 9, and that the top portion 11 terminates a slight distance rearwardly of the vertical wall 8 thus leaving an open space rearwardly of the part 11 between the side walls 10 for the slidable portion of the box, as will be presently explained.

Secured to the rear edge of the part 11 and extending throughout its entire length is a gutter or trough 13, which as shown in Fig. 3 of the drawing communicates at its ends with transversely disposed grooves 14 in the upper portion of the walls 10 and in the upper longitudinally extended reinforcing pieces 15 which are secured to the upper inner portion of each of the side walls. The grooves 14 communicate at their outer ends with vertically disposed grooves 16 in the outer surface of each of the side walls 10, thus providing passageways for the outlet of water.

While I have shown each of the side walls 10 provided in its outer surface with a vertical groove 16, yet it is manifest that a groove in one of these walls may be omitted. Secured by means of hinges to the upper surface of the part 11 of the box is a door 17 which may be of any suitable construction but of sufficient size to close the space between the side walls 10 of the box rearwardly of the rear edge of the part 11. The door 17 is provided in its hinged edge with a rabbet 18 for the reception of the gutter 13 when said door is in its lowered or closed position as shown in Fig. 1 of the drawing.

Secured to the inner surface of each of the reinforcing strips 15 of the side walls of the box, when said strips are employed, is a longitudinally extended guide rail 19 each of which has its lower surface parallel with a guide rail 20 secured to the floor 9 along the inner surface of the longitudinally extended reinforcing members 21 which are secured to the inner lower surface of each of the side walls of the box. The upper surface of each of the guide rails 19 is rearwardly and downwardly inclined and provide inclined supports for the side edges of the door 17. Each of the members 15 is provided on its inner upper portion with a gutter or trough 22 which are rearwardly inclined and rest just above the guide rails 19. The side edges of the door 17 are provided with rabbets 18 for the reception of said troughs or gutters when the door is in its lowered position. This door as well as the entire box, is provided on its outer surface with a sheet metal covering 23 of the ordinary kind and in the usual well known way.

The rear edge of the door 17 is downwardly and forwardly beveled and the rear edge of the metal covering 23 thereon is extended downwardly from said beveled edge of the door to provide an overlapping portion 24 for the rear upper end 25 of the extensible or slidable portion of the box. The portion 24 of the cover of the door 17 may be provided with locking means adapted to coöperate with the upper portion of the part 25 for locking the parts together.

The extensible portion of the device consists of a box-like receptacle of a size to fit snugly in the space between the sides 10 of the fixed box yet so as to have free longitudinal movement therein. The rear end 25 of this movable box is preferably beveled at its upper edge to correspond with the bevel of the rear edge of the door 17 and is preferably inclined as shown in Fig. 1 of the drawing. This movable or extensible box consists of upright side walls 26, a horizontally disposed floor 27 and the reinforcing rear end 28 to which the member 25 is secured in any suitable way.

By this construction of the slidable box it is manifest that its upper portion and its front end will be open, thus permitting articles of an elongated nature located in the two boxes when the slidable box is extended rearwardly, to project through the front end of the slidable box and to rest against the rear surface of the front wall 8 of the fixed box.

By reference to Figs. 3 and 4 of the drawings, it will be seen and understood that the sides 26 and the bottom 27 of the sliding box will rest between the guide rails 19 and 20 on each side of the fixed box so as to permit of back and forth movement of the slidable box.

In order to strengthen the device, and to hold more securely the slidable box, when it is extended rearwardly against any possible vertical movement by reason of the load on the rear end of said box, I secure to the inner surface of each pair of reinforcing strips 15 and 21 of the fixed box an upright metallic guide piece 29 each of which has at its upper end an inwardly extended hooked flange 30 to coöperate with the upper edges of the sides 26 of the movable box.

Each of these members 29 is provided at its lower end with an inwardly extended flange 31 on which the bottom of the movable box will rest and slide.

In the drawings, particularly in Figs. 1 and 2 thereof, I have shown different means for preventing or restricting the rearward movement of the slidable box with respect to the fixed box. One of these means consists in providing the floor 9 of the fixed box with a vertical opening 32 about midway between its sides and near its rear end. This opening may have inserted therein a short metal tube 33 to prevent wear. The floor 27 of the slidable box is provided with a series of vertical spaced openings 34 arranged in a line extended longitudinally through the middle of said floor and each of the last named openings may be provided with a metal tube 35 to prevent wear which might be occasioned by a coupling pin 36 which is extended through one of the openings 34 into the opening 32 of the floor of the fixed box. By this arrangement it is apparent that by removing the pin 36 from one of the openings 34, for example from the rearmost opening thereof, the slidable box can be moved rearwardly until another of the openings 34 alines with the openings 32 in the floor of the fixed box, when by inserting the pin 36 through the registering opening 34 with the opening 32, the movable box will be prevented from longitudinal movement in either direction. Another means for restricting the rearward movement of the slidable box consists in the employment of locking fingers 37 one of which may be pivotally secured near its upper end to the inner surface of each of the guide rails 19 at a suitable distance from its rear end, said finger, or fingers if one on each guide rail is used, is prevented pivotal movement in one direction by means of a pin 38, see Fig. 1, secured in the guide rail 19 near the pivot of the finger but above the same. When this construction is employed for restricting the longitudinal movement of the slidable box, said box is provided with a series of spaced projections or pins 39 which extend inwardly from the upper portion of the side 26 of the box adjacent the pivoted finger. By this arrangement it is manifest the finger 37 can be manually raised from the vertical position shown in Fig. 1 so as to permit the slidable box to be moved rearwardly to the desired point without obstruction by the finger, when by allowing the finger to assume its vertical position through its gravity, it is obvious that in any further rearward movement of the movable box one of the pins 39 will strike the finger on its front surface and thus hold the slidable box against rearward movement as the pin 38 would lock the finger 37 against pivotal movement.

Another simple means for restricting rearward movement of the slidable box is shown which consists in securing a cable or chain 40 at one of its ends to one of the sides 26 of the slidable box and the other end of said cable or chain to the rail 19 adjacent said side. The operation of this last named means is so manifest as not to need further explanation.

To provide means for supporting the rear ends of elongated articles which it might be desired to carry on top of the box or partially within the box when the slidable box is extended rearwardly, I have provided the last named box with a bolster or yoke which consists of a pair of parallel arms 41 pivotally secured at one of their ends to the sides 26 of the slidable box near the upper rear portions thereof as will be clearly understood by reference to Figs. 1, 3 and 4 of the drawings. These arms are transversely united by means of a bar 42 which will normally occupy about the position shown by continuous lines in Fig. 1 of the drawings. After the hinged door 17 has been raised and the slidable box has been moved rearwardly, it is evident that this bolster or yoke can be turned on its pivot screws 43 to about the position shown by dotted lines in Fig. 1 when it is manifest that the bar 42 will be positioned horizontally above the sides of the fixed box and in about a horizontal plane with the upper surface of the part 11 of said box, so that after the door 17 has been lowered, elongated articles such as boards, scantlings, weather strips and the like can be placed on the upper surface of the part 11 of the box at their front ends and allowed to rest near their rear ends on the supporting bar 42 in which position they can be held by means of ropes or the like secured to the sides of the fixed box and extended transversely over the said articles. If it is desired, it is obvious that the front ends of such articles can be located within the front portions of the fixed box and slidable box while their rear ends will extend in an upwardly inclined position over the supporting bar 42 of the bolster, in which arrangement the door 17 can be lowered so as to rest on the upper surface of the inclined material.

In Fig. 5 of the drawing I have shown a detached perspective view of a frame-like guide member which I may employ for supporting the sides of the slidable box instead of employing the guide rails 19 and 20 for said sides as shown in Figs. 3 and 4. The guide member now under consideration consists of a pair of parallel members or rails 43 and 44 which are angular in cross-section and have their horizontal flanges extended in the same direction. These members or rails are connected by uprights 45 and 46 the latter of which has an inwardly extended hooked flange 47 to overlie and engage the upper part of the side of the movable box adjacent to said guide member. In employing this modified construction, one of the guide members is secured to each side of the inner surface of the fixed box so that the rear ends of the rails 43 and 44 will be about flush with the rear ends of the sides of said fixed box. When thus positioned, it is manifest that the modified guide members will take the place of the guide rails 19 and 20 in the first described construction and that the hooked flanges 47 of the uprights 46 of the modified form will take the place of the hooked flanges 30 of the other construction.

From the foregoing it will be readily understood that by my improvements the interior of the boxes when they are in their normal positions as shown in Fig. 1, will be kept dry should the automobile be driven in the rain, by reason of the construction of the gutters coöperating with the perimeter of the hinged door which closes the opening in the top of the box.

Having thus fully described my invention, what I claim as new and desire to secure by Letters Patent is—

1. In a device of the class described, the combination with a box suitably supported on the frame of an automobile having its rear end and a part of its top open, of a door hinged to the top of the box and adapted to close the opening in said top, another box slidably mounted within the first named box and having at its rear end an end piece adapted to close the open end of the first named box when the inner box is in its normal position.

2. In a device of the class described, the combination with a box suitably supported on the frame of an automobile and having its rear end and a part of its top open, of a door hinged to the top of the box and adapted to close the opening in said top, a trough mounted on the rear lower portion of the rear edge of the top of the box and disposed transversely beneath the adjacent edges of the top and said door and having at least one of its ends in communication with an outlet in one of the side walls of the box, another box slidably mounted within the first named box and having at its rear end an end piece adapted to close the open end of the first named box when the inner box is in its normal position.

3. In a device of the class described, the combination with a box suitably supported on the frame of an automobile and having its rear end and a part of its top open, of a door hinged to the rear end of the top of the box and adapted to close the opening in said top, a trough mounted on the rear lower portion of the rear edge of the top of the box and disposed transversely beneath the adjacent edges of the top and said door and having at least one of its ends in communication with an outlet in one of the side walls of the box, a trough mounted in a rearwardly inclined position on the inner surface of the upper part of each of the sides of said box, and another box slidably mounted within the first named box and having its rear end closed, said end being adapted when the inner box is in its normal position, to occupy a position about flush with the extreme rear ends of the first named box and the door thereof.

4. In a device of the class described, the combination with a box suitably supported on the frame of an automobile and having its rear end and a part of its top open, of a door hinged transversely to the top of the box and adapted to close the opening in said top, another box slidably mounted within the first named box and having its rear end closed, and coacting means between the first named box and the inner box to restrict the rearward movement of the latter.

5. In a device of the class described, the combination with a box suitably supported on the frame of an automobile and having its rear end and a part of its top open, of a door transversely hinged to the top of the box and adapted to close the opening in said top, another box slidably mounted within the first named box and having its rear end closed, and a substantially rectangular frame-like bolster pivotally connected to the side walls of the inner box near its rear end.

6. In a device of the class described, the combination with a box suitably supported on the frame of an automobile and having its rear end and a part of its top open, of a door transversely hinged to the top of the box and adapted to close the opening in said top, another box slidably mounted within the first named box and having its front end and upper portion open and provided with an end piece at its rear end adapted to close the open end of the first named box when the inner box is in its normal position.

7. In a device of the class described, the combination with a box suitably supported on the frame of an automobile and having its rear end and a part of its top open, of a door transversely hinged to the top of the box and adapted to close the opening in said top, another box slidably mounted within the first named box and having its front end and upper portion open and provided with an end piece at its rear end adapted to close the open end of the first named box when the inner box is in its normal position, and coacting means between the first named box and the inner box to restrict the rearward movement of the latter.

PETER L. HEDBERG.